March 24, 1970 W. R. EVANS 3,502,861
FISHING LIGHT
Filed Jan. 30, 1967
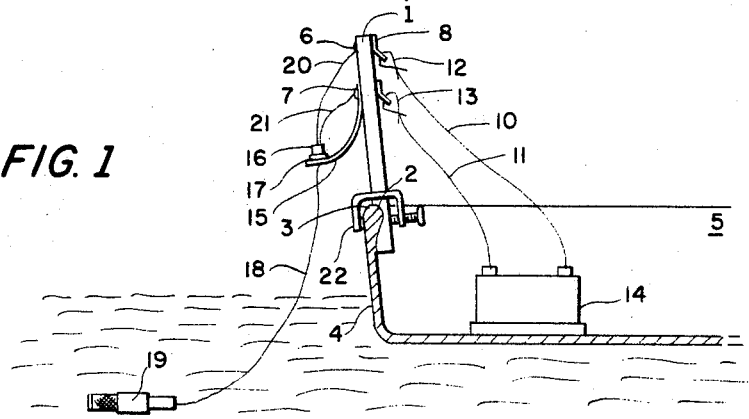
FIG. 1
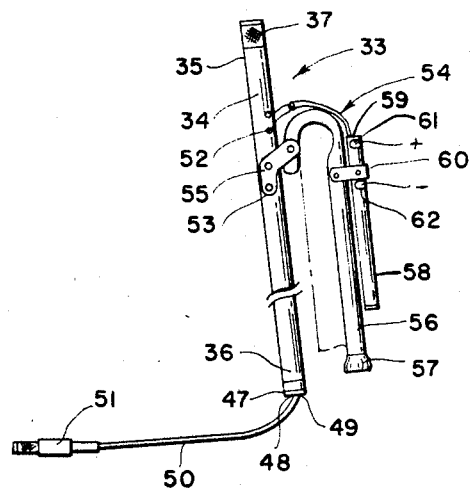
FIG. 2
FIG. 3
FIG. 4
INVENTOR
WILLIAM R. EVANS
BY Edmund M. Jaskiewicz
ATTORNEY

United States Patent Office 3,502,861
Patented Mar. 24, 1970

3,502,861
FISHING LIGHT
William R. Evans, 1817 Overbrook, Tyler, Tex. 75701
Filed Jan. 30, 1967, Ser. No. 612,706
Int. Cl. F21v *21/00, 31/00*
U.S. Cl. 240—26        6 Claims

ABSTRACT OF THE DISCLOSURE

A post is mounted vertically upon the stern of a boat by a U-shaped mounting member having a shorter leg connected to the post and longer leg positioned against the inner surface of the stern. A flexible cable extends from the lower end of the post and has a water-tight sealed light on its end to trail freely in the water.

---

The present invention relates to fishing lights which are detachably mounted on boats, more particularly, to such lights which are submergible in water and are connected to the boat mounting bracket by means of a flexible water tight conduit enclosing the electrical leads.

Many forms of lights have been devised for mounting on boats or other fishing rigs to provide illumination during night fishing operations. Such lights have generally been cumbersome and complex in structure so as to preclude the portability of such lights. As a result, these lights have usually remained fixed on boats and have been undesirable when the boat is used other than at night. Further, while such lights provide adequate illumination for night fishing operations they invariably attract bugs and other insects which are annoying to the fishermen.

It is therefore the principal object of the present invention to provide a novel and improved fishing light mountable on a boat.

It is a further object of the present invention to provide a submergible fishing light to provide below-surface illumination of the water for the fishermen.

It is a further object of the present invention to provide a fishing light which may also provide a stern light for the fishing boat.

In one aspect of the present invention there is provided a mounting post which is detachably mounted to the stern of a boat by C-clamps or the like. Electric terminal means are provided on the post and flexible electric leads extend from the terminals through a flexible water tight conduit to a water tight sealed lamp. The lamp is submergible in the water to a depth of about 30 inches. When the post is mounted on the stern of a boat a source of electrical energy such as a battery is connected to the terminals to provide electrical energy to the lamp. During fishing operations, the lamp is suspended from the stern of the boat and provides illumination below the surface of the water.

In a modification of the present invention the fishing light comprises a post mountable in a vertical upright position by means of a U-shaped mounting member having legs of unequal length with the shorter leg being pivotally connected to the post. The bend of the mounting member is shaped to conform to the top edge of the stern of the boat. A stern light is provided on the top end of the post to provide illumination in all directions. A submergible fishing light is provided in a water tight sealed casing which is connected by a flexible conduit to the bottom end of the post. Flexible electrical leads extend from both the submergible light and the stern light through the post to electrical terminal means mounted on the longer leg of the U-shaped mounting member. The post is preferably hollow so that the leads may be passed therethrough. Also, when not in use the submergible light and its leads may be inserted into the post for storage. The longer leg of the U-shaped mounting member also may be hollow so as to provide a storage compartment for spare lamps and other parts. A cylindrical member of electrically insulating material may be mounted on the longer leg of the U-shaped mounting member and the electrical terminal means carried on this cylindrical member. In operation, the terminal means are connected to a source of electrical energy carried in the boat such as a battery.

Other objects and advantages of the present invention will be apparent upon reference to the accompanying description when taken in conjunction with the following drawing wherein;

FIGURE 1 is an elevational view of a fishing light according to the present invention clamped in position on the stern of a boat with the boat being shown in section;

FIGURE 2 is a view similar to that of FIGURE 1 but showing a modification of the present invention;

FIGURE 3 is a perspective view in enlarged scale of the top portion of the post shown in FIGURE 2; and FIGURE 4 is a longitudinal sectional view of the submergible light showing the details of construction.

Proceeding next to the drawings wherein like reference symbols indicate the same parts throughout the various views a specific embodiment and modification of the present invention will be described in detail.

The fishing light as illustrated in FIGURE 1 comprises a hard wood mounting post 1 having a notch 2 in its lower end to fit about the edge 3 of the stern 4 of a boat indicated generally at 5. The terminal means are located at the upper end of the post and comprise bolts 6 and 7 which pass through the post. Contacts of sheet lead and indicated at 8 and 9 are mounted at the inner ends of bolts 6 and 7. These contacts are connected to a 6 or 12 volt DC source of electrical energy through leads 10 and 11 which are secured to the contacts by clamps 12 and 13. The source of energy may be a dry or wet cell battery as indicated at 14 and carried within the boat.

A standoff strap of sheet aluminum 15 is mounted on terminal post 7 and is provided with an opening 16 having a rubber grommet 17 therein. A flexible water-tight conduit 18 is received within the grommet 17 and has at its outer end a water-tight submergible lamp 19. The electric leads for the lamp are indicated at 20 and 21 and extend from terminal posts 6 and 7 through the flexible conduit 18 to the lamp 19.

The post may be secured to the stern of the boat by a conventional C-clamp 22.

The submergible light 19 is illustrated in greater detail in FIGURE 4 and comprises a cylindrical hull 23 of plastic in which is housed a single filament or double filament bulb 24 mounted in a neoprene cup bulb retainer 25 from which extend the leads 20 and 21 through a neoprene retainer seal 26 located in an opening 27 in end cap 28. The end cap is mounted on the open end of a cylindrical member 29 whose other end is inserted within the plastic cylinder 23. A lead weight of a suitable weight is provided at 30 within cylindrical member 29 to properly weight the submergible lamp so that the lamp will descend below the surface of the water into the position as substantially illustrated in FIGURE 2.

The other end of the plastic cylinder 23 is covered with a cylindrical mesh or screen 31 to protect the lamp. A removable end plug 32 is inserted in the end of the screen 31 to provide access to the lamp.

The bulb 24 is sealed within the bulb retainer 25 by a suitable water-proofing compound.

Proceeding next to FIGURE 2 there is illustrated a modification of the fishing lamp of the present invention which in addition to the submergible light also has a stern light for the boat. In this modification, indicated generally at 33, there is provided a tubular post 34 having upper end 35 and lower end 36. The post 34 may be made of polyvinyl chloride. A stern light 37 is provided in the top of post 34 and is illustrated in greater detail in FIGURE 3. The light 37 comprises a bulb 38 held in a bulb retainer of neoprene or the like 39 and suitably sealed in the top end of post 34. A rust-resistant screen or mesh 40 protects the light and is closed by a removable end plug 41. The leads from the bulb are indicated at 42 and 43 and are doubled over as indicated at 44 to provide slack in the lead wires so that the bulb may be removed from the end of the post for repair or replacement. The leads extend outwardly from the post through an opening 45 protected by a rubber grommet 46.

The lower end 36 of post 34 is closed by a cap 47 having an opening 48 therein protected by a rubber grommet 49 through which passes a flexible water-tight conduit 50 at the end of which is provided a submergible light 51 similar to the light illustrated in FIGURE 4. The leads for the light extend through flexible conduit 50 and emerge from the post through a grommet-protected opening 52.

Mounted on post 34 just below the openings for the leads is a bracket 53 from which is pivotally mounted U-shaped mounting member indicated generally at 54 and having a short leg 55 and long leg 56. The long leg 56 is preferably hollow and provides a compartment for storing spare parts and the like. The end of this leg is closed by a rubber or plastic end cap 57.

Mounted on leg 56 is a cylindrical member 58 of an electrically insulating material. This cylindrical member is hollow and is provided with a hard wood core 59 at its upper end.

Cylindrical member 58 is secured to leg 56 by a bracket 60. A pair of terminal contacts 61 and 62 are mounted on cylinder 58 through the hard wood core 59. The leads from stern light 38 and from the submergible light 51 are connected to the respective terminal contacts 61 and 62.

Thus it can be seen that the present invention provides a compact, light-weight portable light which furnishes illumination for night fishing by illuminating the water below the water surface. Further, this light can be modified to provide a 360° stern light which is readily visible in all directions. By locating the light source below the surface of the water, bugs and other insects are not attracted to the location. The light of the present invention is not limited to fishing operations but may also be used in marine life research, an underwater source of light for skin divers, and as an underwater guide light. The present light provides unshielded low heat output with a minimum drain on the source of energy supplied.

In addition, the light embodies a simplicity in construction and provides a shielded directional light beam in a weighted outer shell. The simplicity of construction permits ready access to the operating components and greatly facilitates repair and maintenance of the light. The underwater directional light beam greatly reduces reflection from the hull of the boat.

It is understood that this invention is susceptible to modifications in order to adapt it to different usages and conditions, and accordingly, it is desired to comprehend such modifications within this invention as may fall within the scope of the appended claims.

What is claimed is:

1. A fishing light comprising a post having upper and lower ends, a light on said post upper end, a water tight flexible conduit extending freely from the lower end of said post of sufficient length to trail in the water, a water tight sealed light on the end of said conduit for submersion in water and spaced from said post lower end, a U-shaped mounting member having one leg attached to said post, electrical terminal means on one of said posts and said U-shaped mounting member, and flexible electric leads connected from said post light and within said flexible conduit from said water tight light to said terminal means.

2. A fishing light as claimed in claim 1 with said U-shaped mounting member having legs of unequal length and the shorter leg thereof being pivotally connected to said post, said electrical terminal means being mounted on the longer leg of said U-shaped mounting member.

3. A fishing light as claimed in claim 2 wherein said post comprises a hollow tubular member, said electric leads from said light being enclosed in said post.

4. A fishing light as claimed in claim 2 with the longer leg of said U-shaped member being hollow to define a storage compartment for spare parts.

5. A fishing light as claimed in claim 2 and further comprising a cylindrical member of non-electrically conducting material mounted on said longer leg of said U-shaped mounting member, said electrical terminal means being mounted on said cylindrical member.

6. A fishing light as claimed in claim 5 wherein said cylindrical member is hollow to define a compartment for spare parts.

References Cited

UNITED STATES PATENTS

| | | | |
|---|---|---|---|
| 1,161,939 | 11/1915 | Lewis | 240—26 |
| 1,185,904 | 6/1916 | Hendricks | 240—26 |
| 2,354,237 | 7/1944 | Wendel | 240—26 |
| 2,757,276 | 7/1956 | Campbell | 240—26 |
| 2,779,866 | 1/1957 | Burlingham | 240—26 |
| 3,253,136 | 5/1966 | Faul | 240—7.5 |
| 1,663,465 | 3/1928 | Neff. | |

JOHN M. HORAN, Primary Examiner

R. P. GREINER, Assistant Examiner

U.S. Cl. X.R.

43—17.5